United States Patent [19]

Guibert et al.

[11] Patent Number: 5,015,279

[45] Date of Patent: May 14, 1991

[54] APPARATUS FOR EXTRACTING SPIN CAST FUSED SILICA OBJECTS

[75] Inventors: Paul Guibert, Bellegarde; Francis A. P. Launay, Pithiviers-le-Vieil, both of France

[73] Assignee: Quartz & Silice, Courbevoie, France

[21] Appl. No.: 542,858

[22] Filed: Jun. 25, 1990

Related U.S. Application Data

[62] Division of Ser. No. 309,585, Feb. 10, 1989.

[51] Int. Cl.[5] .............. C03B 19/00

[52] U.S. Cl. .............. 65/302; 414/590; 414/737; 65/266; 65/144; 65/71

[58] Field of Search .............. 65/71, 302, 122, 157, 65/266, 260, 110, 89, 239, 241, 272, 144; 414/589, 590, 737; 901/40

[56] References Cited

U.S. PATENT DOCUMENTS

| | | | |
|---|---|---|---|
| 2,198,750 | 4/1940 | Winder | 49/29 |
| 3,150,951 | 9/1964 | Mayhew | 65/71 |
| 3,205,057 | 9/1965 | Benard | 65/260 |
| 3,419,375 | 12/1968 | Meiresonne | 65/260 |
| 4,018,342 | 4/1977 | Cuniberti et al. | 414/737 |
| 4,416,680 | 11/1983 | Bruning | 65/302 |
| 4,528,163 | 7/1985 | Albrecht | 422/249 |
| 4,632,686 | 12/1986 | Brown | 65/71 |
| 4,635,985 | 1/1987 | Rooke | 901/40 |
| 4,799,854 | 1/1989 | Niskala | 414/737 |

FOREIGN PATENT DOCUMENTS

| | | | |
|---|---|---|---|
| 8431822 | 10/1984 | Fed. Rep. of Germany . | |
| 584224 | 4/1924 | France . | |
| 2377747 | 8/1978 | France | 901/40 |
| 205238 | 1/1968 | U.S.S.R. . | |
| 324231 | 2/1972 | U.S.S.R. | 414/737 |
| 443846 | 12/1972 | U.S.S.R. . | |
| 1008165 | 3/1983 | U.S.S.R. . | |
| 1042993 | 9/1983 | U.S.S.R. | 901/40 |
| 7514 | of 1890 | United Kingdom . | |

*Primary Examiner*—Richard V. Fisher
*Assistant Examiner*—John J. Bruckner
*Attorney, Agent, or Firm*—Pennie & Edmonds

[57] ABSTRACT

Apparatus for removing a fused silica glass object from a rotating pot has a gripping member which grips the upper rim of the fused silica glass object and a rotational synchronization member connected to the gripping member which is lowered vertically into frictional contact with the rotating pot. The rotation of the pot drives the rotation of the synchronization member which drives the rotation of the gripping member. The object can be withdrawn vertically from the pot without the angular velocities of the object and pot diverging.

14 Claims, 2 Drawing Sheets

20
18
20
19
15
27
28
28
25
25
17
26
14
16
10
13
11

APPARATUS FOR EXTRACTING SPIN CAST FUSED SILICA OBJECTS

This is a division of application Ser. No. 309,585, filed Feb. 10, 1989.

TECHNICAL FIELD

This invention concerns a method of and an apparatus for extracting from a pot an object produced by fusion of a layer of refractory material in the pulverulent state and specifically the extraction of a silica object produced by fusion of a layer of pulverulent material rich in silica.

BACKGROUND ART

It is known to manufacture such an object by means of an apparatus similar to that described as follows: a circular platform, rotatable about its central axis, hereinafter termed carousel, supports several cylindrical pots also capable of rotation about their vertical axes. The rotation of the carousel brings each pot successively into different positions which correspond to one phase of the manufacturing process. For example, silica-rich pulverulent material is fed into the pot; fusion of said material; cooling of the object produced by fusion; extraction of the object.

The pots, generally of metal, are filled with a refractory pulverulent material which provides thermal insulation. With the pot in rotation, the material is hollowed out in such a manner as to define a cylindrical cavity, the axis of which coincides with the axis of the pot. The bottom and the wall of said cavity have a uniform surface at the end of a reaming operation carried out by moving a blade or cutter vertically and horizontally. Under the action of the centrifugal force, the remaining material remains pressed against the wall of the pot.

The pot, while still rotating, arrives vertically beneath an apparatus for ensuring fusion of the wall and bottom of the cavity thus formed to a certain depth. The apparatus used is generally an electric arc. The material thus melted is a material rich in silica, which may be composed simply of the material serving as insulation, for example sand. But it may be composed of a purer material, for example quartz powder. The latter is deposited in a known manner onto the bottom and the wall of the cavity formed in the insulating material.

When fusion is completed, the carousel brings the pot into another position, where the object produced cools down. From the start of the cooling phase, the motor causing rotation of said pot is stopped.

Finally, the rotation of the carousel brings the stopped pot into another position for the extraction operation. As soon as the object has been extracted from the stationary pot, the material, which is no longer held in place by centrifugal force, collapses. To enable the pot to be used again, it is therefore necessary to reconstruct the central cavity. This return to the initial conditions is bought at the expense of a loss of time and material. Furthermore, the means used for the extraction of the object may cause defects in its surface and may result in it being rejected.

SUMMARY OF THE INVENTION

The objective of the invention is to permit objects manufactured in accordance with the above process, to be extracted, in such a manner as to prevent collapse of the material and to reestablish the uniform surface of the central cavity in a shorter time and with maximum economy of material.

A further objective is to provide a means enabling the object to be extracted while eliminating any cause of formation of defects on its internal or external surface.

These objectives are achieved by a method, according to which a pot capable of rotating about its own axis is filled with a refractory pulverulent material. The pot is rotated causing a cavity having a uniform boundary to form in said material, the axis of the cavity coinciding with that of the pot, and the bottom and wall of which cavity are formed to a determined thickness of a silica-rich material. Then said material is melted to at least a fraction of its thickness, the object formed is cooled, and the object is extracted vertically. This method consists essentially of causing the pot to rotate during the extraction operation and of extracting the object, the latter still turning, at least initially, at the same speed as the pot.

In the method according to this invention, a gripping member is brought above the rotating pot and its axis of rotation is aligned with that of the pot. A rotational speed equal to that of the pot is imparted to the gripping member and the member is applied onto the edge of the object. The pressure between the object and the gripping member is reduced and the gripping member is raised with the object adhering to it.

The apparatus for carrying out the method according to this invention is a gripping member fixed on a vertical axis, integrally connected to a motor device capable of moving it vertically. This member may be connected to a motor capable of causing it to rotate about its vertical axis at the same speed as the pot before arriving in contact with the object. This member may comprise a device which assures synchronization of the rotational speeds through the intermediary of at least one component coming into contact with the edge of the pot such as a gripping head fixed to the vertical axle and intended to be applied onto the summit of the object. The synchronization device may be integral with the gripping head or may be connected directly to the vertical axle.

The gripping head is of a heat-resistant material, for example graphite Its dimensions are such that it comes into bearing exactly on the periphery of the object. This gripping head is perforated by at least one duct, which opens out onto its lower face, said duct communicating through the vertical axle with a vacuum pump. The zone of the gripping head which comes into contact with the edge of the object is made of a material which assures a hermetic closure.

BRIEF DESCRIPTION OF THE DRAWINGS

The characteristics of the invention and its advantages will be explained in more detail in the following description of one of its embodiments, illustrated by the attached drawing figures, wherein.

DETAILED DESCRIPTION OF THE PREFERRED EMBODIMENTS

Figure 1:
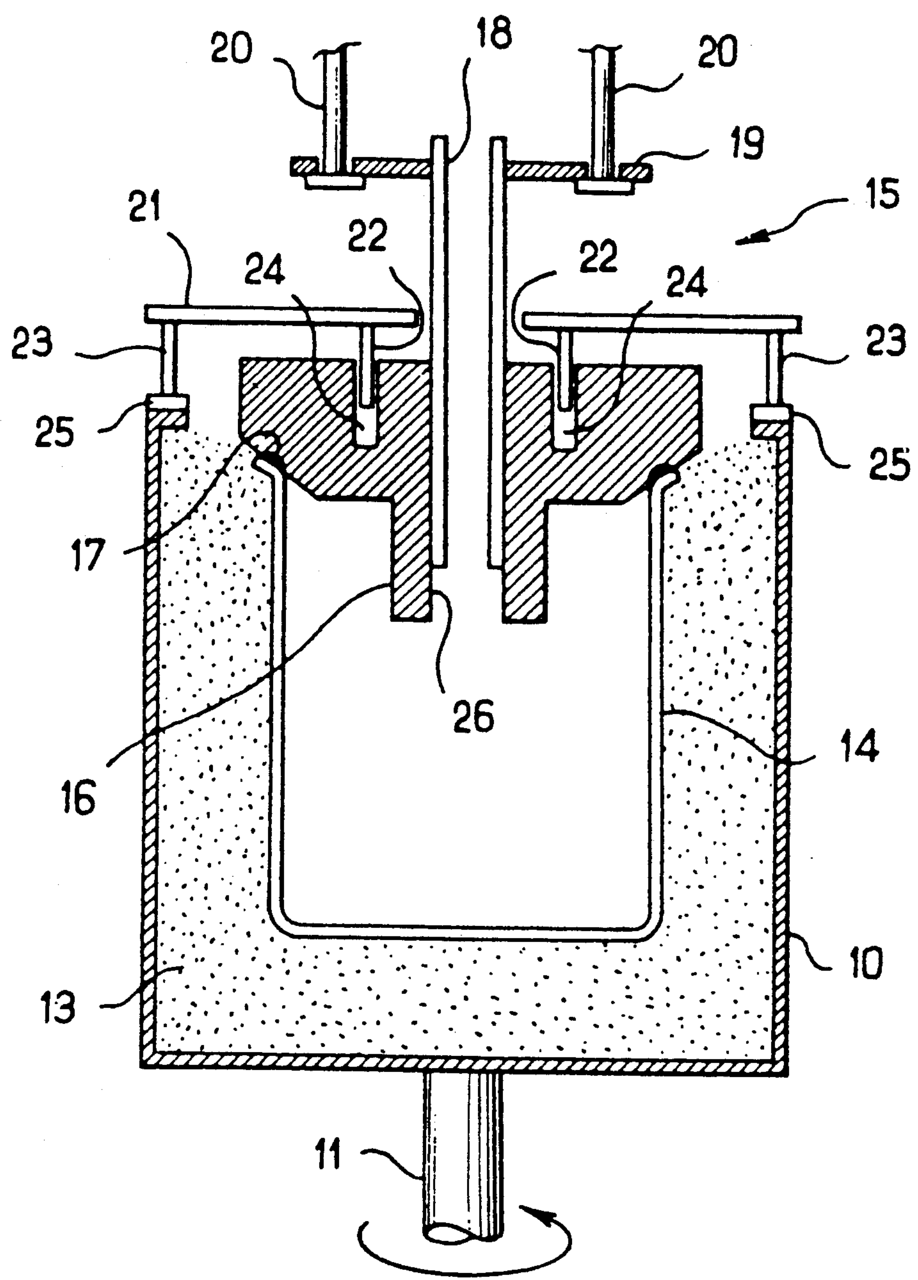
FIG. 1 is a cross-sectional view taken vertically through the center of the device of the present invention.

The installation shown in FIG. 1 comprises a pot 10 of cylindrical form, connected to a device for rotational driving, not illustrated, by means of an axle 11. This pot, preferably of metal, contains a layer of sand 13 covering the base and the wall which is kept in place under the action of the centrifugal force. Pot 10 contains, at its center, a crucible 14 of silica glass, which has just been produced by fusion of a layer of quartz powder of high purity deposited on sand layer 13 while pot 10 is rotating.

The gripping member 15 has a gripping head 16 of graphite which is equipped with an asbestos seal 17. Head 16 is traversed, throughout its height and along its axis, by a duct 26, which opens out at its lower end towards the interior of crucible 14. Head 16 is fixed to a hollow pipe 18, which is located within duct 26 and which rotates freely within a support 19. This support 19 is connected to an electrically operated jack, not shown, for vertical displacement of the gripping members 15, the displacement being guided by bars 20.

A plate 21 rests on the upper face of head 16. This plate, which may be termed a rotational synchronization member, has a diameter at least equal to that of pot 10. Rods 22, 23 are fixed vertically to the lower face of plate 21. Rods 22 engage seatings 24 formed in the top of the head 16. Rods 23 are fixed to the periphery of plate 21 and their ends are equipped with skids 25.

When the gripping member 15 is vertically displaced downwardly, the skids 25 initially bear against the edge of rotating pot 10. Plate 21 and head 16 are thus entrained in a rotary movement, the speed of which rapidly becomes equal to that of the pot. Seatings 24 allow head 16, while rotating, to continue its descent until seal 17 comes into bearing against the upper rim of crucible 14. The speed of descent of gripping member 15 is fairly low, preferably less than or equal to 2 meters per minute.

From the time the seal 17 contacts the rim of the crucible 14, a vacuum pump (not shown), which is connected to the top of pipe 18, begins to operate and is used to create a partial vacuum in crucible 14. The motor device which is used to lift gripping member 15 to is then brought into action. The lifting speed is also slow, at least at the start, so that the crucible can be removed without disturbing the adjacent sand layer 13. This speed is preferably less than or equal to 2 meters per minute.

Figure 2:
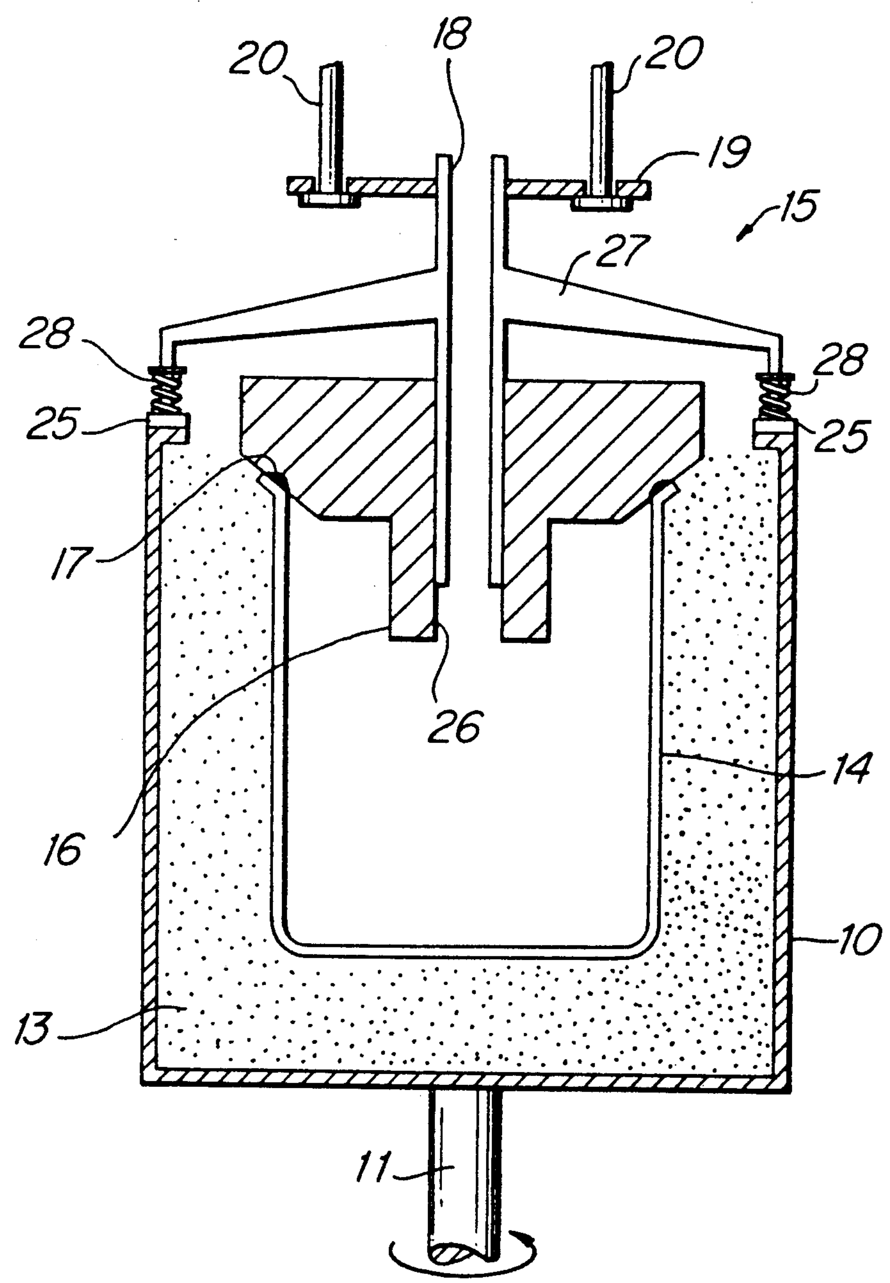
FIG. 2 is a cross-sectional view taken vertical through the center of an alternate embodiment of the device of the invention.

The embodiment described above in FIG. 1 corresponds to the category of gripping members according to which the synchronization device is integral with the gripping head 15. Alternately, this method may be carried out by a gripping member in which the synchronization device is directly fixed to the vertical axle 18, as shown in FIG. 2.

Thus, in this alternate embodiment, the synchronization device includes several arms (for example, three in number) 27 fixed to the vertical pipe 18. The end of each arm 27 is equipped with an elastic means (for example, a spring) 28 to the end of which a skid 25 is fixed. The gripping head is identical to that of gripping member 15 previously described, with the exception that it no longer comprises seatings 24. As before, the skids 25 come into contact with the pot first, and the gripping member can continue its descent by compression of the springs 28.

The foregoing description relates to examples of embodiments of the invention. It is, of course, evident that modifications or variants can be effected without thereby departing from the scope of the invention, and that the appended claims are intended to cover such modifications and variants.

What is claimed is:

1. An apparatus for removing a fused silica glass object from a rotating pot containing pulverulent refractory material therein, comprising:

a rotating pot for containing a fused silica glass object;

a gripping member having means for gripping the upper rim of the object for removing said object from said rotating pot, said member capable of moving vertically while rotating and while gripping said object;

a rotational synchronization member operatively associated with the gripping member and located so as to provide frictional contact between said member and the edge of the pot containing said object while said pot and said object are rotating; and means for moving said gripping member vertically downward and upward the upward movement removing said object from said pot said rotational synchronization member being located with respect to said pot so as to impart to said gripping member the rotation of the pot when said rotational synchronization member is moved into frictional contact with the pot.

2. The apparatus of claim 1, wherein the gripping member and vertical movement means are connected by a hollow pipe which rotates freely within a support in said vertical movement means.

3. The apparatus according of claim 2, wherein said rotational synchronization device is affixed to said pipe.

4. The apparatus of claim 3, wherein said rotational synchronization device comprises at least one arm equipped with an elastic means having a skid fixed thereto on the end which is intended to come into bearing with the edge of said pot.

5. The apparatus of claim 2, wherein said gripping member including at least one duct which communicates with said pipe.

6. The apparatus of claim 5, wherein the pipe is connected to a vacuum pump and wherein said gripping member is made of a heat-resistant material.

7. The apparatus of claim 1, wherein the portion of the gripping member which extends into the pot is made of graphite, and its zone of contact with said object is formed of a flexible refractory material.

8. The apparatus of claim 7, wherein said rotational synchronization device is integral with said gripping member and wherein said contact zone is made of asbestos.

9. The apparatus of claim 1, wherein said rotational synchronization device comprises a plate which rests upon said gripping member and has inner and outer rods fixed vertically to the lower face of the plate wherein the diameter of said plate is at least equal to that of said pot and further wherein said inner rods engage seatings formed in the top of said gripping member and said outer rods are equipped at their ends with skids intended to come into bearing with the edge of said pot.

10. An apparatus for removing a fused silica glass object from a rotating pot containing pulverulent refractory material therein, comprising:

a rotating pot for containing a fused silica glass object;

a gripping member for contacting the upper rim of said object to remove said object from said pot, said member capable of rotation and vertical movement towards and away from said pot while rotating and while gripping said object;

a rotational synchronization member operatively associated with the gripping member and located for axially aligning said gripping member with said object and said pot while said pot and said object are rotating, and for imparting the rotation of the pot to the gripping member while said rotational synchronization member is in frictional contact with the pot; and means for vertically moving said gripping member toward and away from said pot while said gripping member is rotating the away movement removing said object from said pot.

11. The apparatus of claim 10 wherein the gripping member includes an axial duct therein and further comprising a vertical pipe communicating with said duct for connection of said gripping member and said vertical movement means.

12. The apparatus of claim 11, wherein said rotational synchronization device comprises a plate which rests upon said gripping member and has inner and outer rods fixed vertically to the lower face of the plate wherein the diameter of said plate is at least equal to that of said pot and further wherein said inner rods engage seatings formed in the top of said gripping member and said outer rods are equipped at their ends with skids intended to come into bearing with the edge of said pot.

13. The apparatus of claim 12, wherein the pipe is connected to a vacuum pump and wherein said gripping member is made of a heat-resistant material.

14. The apparatus of claim 13, wherein the portion of the gripping member which extends into the pot is made of graphite, and its zone of contact with said object is formed of a flexible refractory material.

* * * * *